(12) United States Patent
Stevens et al.

(10) Patent No.: US 11,078,600 B2
(45) Date of Patent: Aug. 3, 2021

(54) METHOD AND APPARATUS FOR FABRICATING A FIBRE ARRAY AND STRUCTURE INCORPORATING A FIBRE ARRAY

(71) Applicant: Nottingham Trent University, Nottingham (GB)

(72) Inventors: Robert Stevens, Nottingham (GB); Joseph Chemmarappally, Nottingham (GB)

(73) Assignee: Nottingham Trent University, Nottingham (GB)

(*) Notice: Subject to any disclaimer, the term of this patent is extended or adjusted under 35 U.S.C. 154(b) by 292 days.

(21) Appl. No.: 16/329,954

(22) PCT Filed: Aug. 31, 2017

(86) PCT No.: PCT/GB2017/052530
§ 371 (c)(1),
(2) Date: Mar. 1, 2019

(87) PCT Pub. No.: WO2018/042173
PCT Pub. Date: Mar. 8, 2018

(65) Prior Publication Data
US 2019/0194825 A1    Jun. 27, 2019

(30) Foreign Application Priority Data

Sep. 1, 2016  (GB) ..................................... 1614778

(51) Int. Cl.
*D01D 5/00* (2006.01)
*B32B 3/26* (2006.01)
(Continued)

(52) U.S. Cl.
CPC ........... *D01D 5/0084* (2013.01); *B32B 3/266* (2013.01); *B32B 7/06* (2013.01); *B32B 27/12* (2013.01);
(Continued)

(58) Field of Classification Search
CPC .......................... D01D 5/0084; D01D 5/0076
See application file for complete search history.

(56) References Cited

U.S. PATENT DOCUMENTS

2005/0104258 A1    5/2005  Lennhoff
2007/0152378 A1*   7/2007  Kim .......................... D01F 6/70
                                                              264/465
(Continued)

FOREIGN PATENT DOCUMENTS

CN         105506783 A      4/2016
EP           1464478 A2    10/2004
(Continued)

OTHER PUBLICATIONS

Xue Y et al: "Fabrication and Characterization of Aligned Continuous Polymeric Electrospun Nanofibers," Micro and Nanosystems (2009), vol. 1, No. 2, pp. 116-122.
(Continued)

*Primary Examiner* — Xiao S Zhao
*Assistant Examiner* — Emmanuel S Luk
(74) *Attorney, Agent, or Firm* — Florek & Endres PLLC

(57) ABSTRACT

In a method of electrospinning nanofibres, a non-conductive laminate fibre collection structure (22) is placed on the surface of a conductive collector (18, FIG. 1). The laminate structure has a base layer (26) proximal to the collector and a fibre support layer (24). A pair of spaced first apertures (32) and a second aperture (34) located between them are defined through the fibre support layer (24). A pair of spaced third apertures (38) are defined through the base layer (26), each third aperture being aligned with one of the first apertures to define an opening (40) through the laminate structure. During electro spinning, the fibre is attracted to one of the openings (40) where it forms a bridge across the respective first aperture (32). A charge in the collected fibre builds up until the fibre is repelled and it moves to the nearest lowest potential region which is the second opening on the opposite side of the second aperture (34). The nanofibre takes shortest path from the first opening towards the second opening and (Continued)

so creates a fibre which extends across the second aperture (34). The process is repeated to build up an array of aligned nanofibres extending across the second aperture.

17 Claims, 8 Drawing Sheets

(51) Int. Cl.
  *B32B 7/06* (2019.01)
  *B32B 27/12* (2006.01)
(52) U.S. Cl.
  CPC ...... *D01D 5/0076* (2013.01); *B32B 2307/206* (2013.01)

(56) References Cited

U.S. PATENT DOCUMENTS

| | | | | |
|---|---|---|---|---|
| 2008/0110342 | A1* | 5/2008 | Ensor | D01D 5/0076 96/54 |
| 2011/0242310 | A1* | 10/2011 | Beebe, Jr. | G06K 9/00577 348/88 |
| 2012/0040581 | A1* | 2/2012 | Kim | D06M 11/00 442/330 |
| 2013/0075266 | A1* | 3/2013 | Kim | C23C 18/1608 205/122 |
| 2014/0163601 | A1 | 6/2014 | Stamberg | |
| 2015/0250927 | A1* | 9/2015 | MacEwan | D01D 5/0007 606/151 |
| 2020/0063289 | A1* | 2/2020 | Kuster | D01D 5/0076 |

FOREIGN PATENT DOCUMENTS

| | | |
|---|---|---|
| WO | 2011/123798 A2 | 10/2011 |
| WO | 2011/159889 A2 | 12/2011 |

OTHER PUBLICATIONS

Verschuren, Jo: "International Search Report for International Application No. PCT/GB2017/052530," European Patent Office, dated Nov. 27, 2017.

Verschuren, Jo: "Written Opinion of the International Searching Authority for International Application No. PCT/GB2017/052530," European Patent Office, dated Nov. 27, 2017.

Nickitas-Etienne, Athina: "International Preliminary Report on Patentability for International Application No. PCT/GB2017/052530," International Bureau of WIPO, dated Mar. 5, 2019.

* cited by examiner

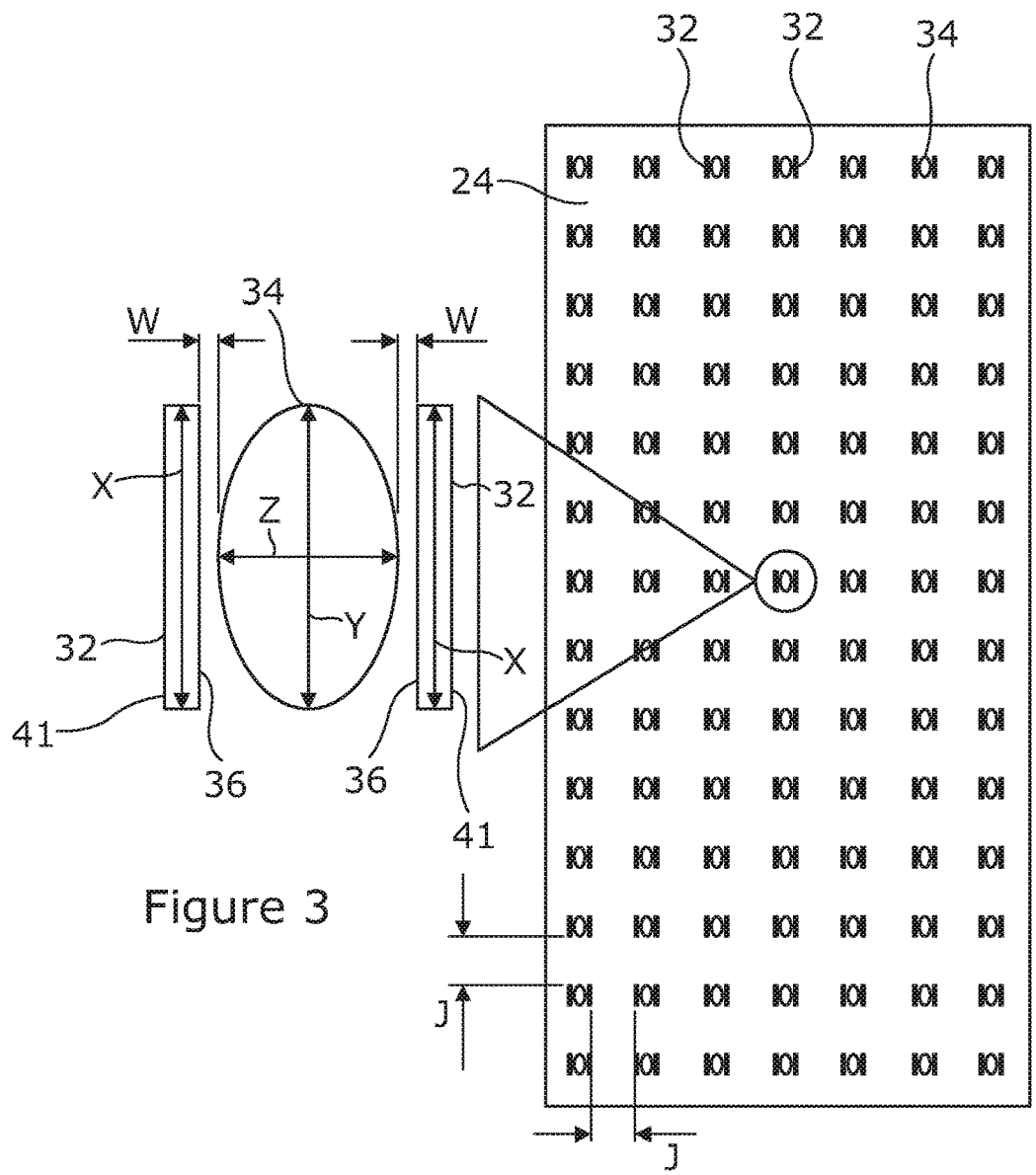
Figure 3
Figure 2
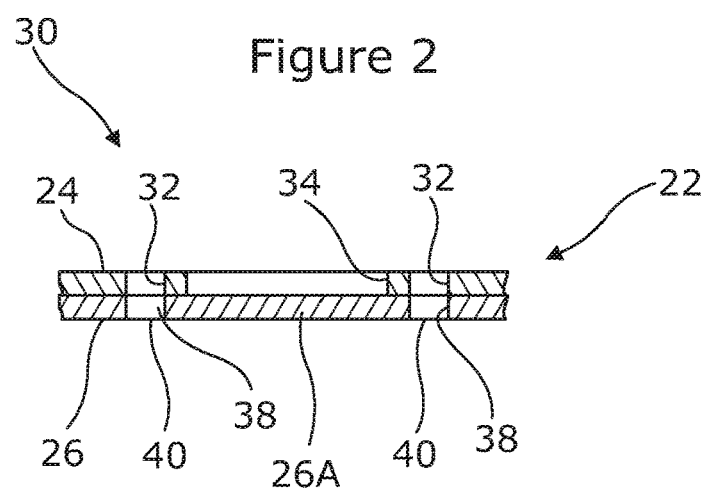
Figure 6

METHOD AND APPARATUS FOR FABRICATING A FIBRE ARRAY AND STRUCTURE INCORPORATING A FIBRE ARRAY

TECHNICAL FIELD OF THE INVENTION

The present invention relates to apparatus and methods of forming a fibre array. The invention also relates to a structure which incorporates a fibre array. The invention is particularly, but not exclusively, concerned with apparatus and methods for producing an aligned array of nanofibres and to a structure which incorporates an aligned array of nanofibres.

BACKGROUND TO THE INVENTION

It is known to produce fibres with very small diameters by a process of electrostatic spinning a polymer. The basic concept is disclosed in U.S. Pat. No. 1,975,504. The process is more generally referred to as "electrospinning" and can be used to produce fibres ranging typically, but not exclusively, between 10 nanometres to 10 micrometers in diameter. FIG. 1 illustrates schematically a typical electrospinning apparatus 10. The apparatus 10 includes a syringe pump 12 which holds a syringe 14 containing an electrospinning fluid. The syringe is fluidly connected to an electrically conductive delivery source or spinneret such as a metal capillary needle 16. A conductive collector 18 is spaced from the needle 16. The collector is typically a flat metal plate or a rotating collector. Rotating collectors may take the form of a cylindrical drum with a conductive outer surface or a re-circulating belt 18 having a conductive outer surface as illustrated. A high voltage electrical supply 19 (typically 5 to 50 kV direct current power supply), is connected to the needle and the collector 18 is grounded or biased at an electrical potential which is opposite to the direct current high voltage power supply connected to the needle 16. To initiate the process, the electrospinning fluid is pumped at a controlled feed rate to the needle. The high voltage is applied to the needle and charge separation in the fluid reduces the surface tension of the fluid at the end of the needle. As the charge density overcomes the surface tension, a Taylor cone 20 is formed and a continuous jet of fluid is emitted towards the conductive collector 18. As the jet of fluid travels towards the collector it desolvates and high molecular weight molecules entangle to form a fibre 21 which is attracted to and deposited on the collector 18. The fluid can be a mixture of polymer molecules, nanomaterials, biomolecules and a solvent. Different mixtures are used to create fibres with different properties. Alternatively, the fluid can be an electrically charged polymer which is maintained in a liquid state by applying heat. In this case, fibres are formed as a result of the liquid melt solidifying due to cooling.

Often, the fibres are collected in the form of a random non-woven mat on the collector. These mats exhibit large surface area per unit mass, high porosity and small pore size, which is useful in several applications like filtration, wound dressing, and also in several tissue engineering applications.

It is also known to use an electrically insulating plastics sheet on top of a conductive collector to collect electrospun nanofibre. Provided the sheet is thin enough, there is sufficient electrostatic attraction to pull the electrospun nanofibre 21 on to the surface of the sheet. By discharging the fibre which has landed on the surface of the sheet prior to depositing new fibre, a thick mat of non-woven unaligned nanofibre can be produced. Discharging can be achieve by using a remote ionisation source. If the collected fibre is not discharged, newly spun fibre 21 is electrostatically repelled and achieving a controlled deposition is problematic.

Apparatus and methods have also been developed which allow electrospun nanofibres to be collected in a uniaxially aligned array. As described in U.S. Pat. No. 8,580,181 B1, one known method of electrospinning fibres in a uniaxially aligned orientation comprises the use of parallel conductive plates spaced apart on either side of an air gap to produce an electric field that aligns the deposited fibres across the air gap. This method has been used to collect two dimensional arrays of uniaxially aligned and oriented fibres. Uniaxially aligned nanofibre arrays can be used for a range of different applications including, but not limited to, tissue engineering, therapeutic inserts, sensors, nanocomposites, electronic devices, filters, and catalyst support for use in micro fuel cells. For example, cells cultured on a scaffold of uniaxially aligned nanofibres will tend to proliferate along the fibres in the direction of fibre orientation.

Handling an array of uniaxially aligned nanofibres can be problematic due to the anisotropic nature of its mechanical properties. In particular, uniaxially aligned arrays tend to exhibit high tensile strength in a direction parallel to the direction of fibre orientation but very low tensile strength in directions normal the direction of fibre orientation as the aligned fibres can be easily pulled apart.

A further problem is in developing apparatus, methods and structures that enable the production of uniaxially aligned arrays of nanofibres on a commercial scale.

There is a need, therefore, for apparatus for fabricating an array of fibres which overcomes, or at least mitigates, some or all of the problems of the known apparatus.

There is also a need for a method of fabricating an array of fibre which overcomes, or at least mitigates, some or all of the problems of the known methods.

In addition, there a need for a fibre supporting structure which incorporates an array of fibres which overcomes, or at least mitigates, some or all of the problems of the known fibre supporting structures.

SUMMARY OF THE INVENTION

Throughout the description and claims of this specification, the words "comprise" and "contain" and variations of the words, for example, "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

For the avoidance of doubt, it should be understood that references in the description and claims to an aligned array of fibres includes an array in which the fibres are predominantly aligned with one another in a common orientation but does not necessarily require that all the fibres are perfectly aligned uniaxially.

In accordance with a first aspect of the invention, there is provided apparatus for electrospinning at least one array of fibres from an electrospinning fluid, the apparatus comprising:

a) a fibre source;
b) a high voltage supply connectable to the fibre source;
c) a conductive collector surface spaced from the fluid source, the apparatus configured to hold at least part of the conductive collector surface at an electrical potential to create a potential difference between said at least part of the conductive collector surface and the fluid source in use; and
d) a non-conductive laminate fibre collection structure covering at least part of the conductive collector surface, the laminate fibre collection structure including a non-conductive base layer proximal to the conductive collector surface and a non-conductive fibre support layer releasably affixed to the base layer, at least one set of apertures defined in the fibre support and base layers, said at least one set of apertures including a first group of apertures defined through the fibre support layer and a second group of apertures defined through the base layer, the first group including a pair of first apertures spaced apart from one another and a second aperture located between the pair of spaced first apertures, the second group including a pair of third apertures spaced apart from one another, each of the third apertures being aligned with a corresponding one of the first apertures to define an opening through the non-conductive laminate collection structure.

The apparatus may comprise an arrangement for moving the conductive collector surface and the fluid source relative to one another. The conductive collector surface may be a surface of a rotatable drum, re-circulating belt, rotating table or translation table. Alternatively, the fibre source may be movable relative to the conductive collector surface, which may be fixed.

A plurality of said sets of apertures may be defined in the laminate fibre support structure, which sets of apertures may be substantially identical to one another. Each set of apertures may be a discreet cell of apertures. In which case, the cells may be spaced apart from one another by a distance which is greater than the spacing between the first apertures in each cell. Alternatively, at least some adjacent sets may share common first and third apertures.

In an embodiment, each of the first and third apertures is elongate, having a length greater than its width. The first and third apertures may be generally rectangular. Where the apparatus comprises an arrangement for moving the conductive collector surface and the fluid source relative to one another, the first and third apertures may be aligned lengthways parallel to one another and to the relative direction of movement between the conductive surface and the fibre source. Where the conductive collector surface is rotatable, the first and third apertures may be aligned lengthways parallel to the direction of rotation, say of a rotating drum or belt.

In an embodiment, the, or each, second aperture is elliptical. In which case, the major axis of the, or each, second aperture may be aligned parallel to the longitudinal extents of the first and third apertures.

In an embodiment, the ratio of length to width of each set of apertures is in the range of 1.5:1 to 1:1.5.

The non-conductive laminate fibre collection structure may be rigid or flexible.

In an embodiment, the conductive collector surface is comprised of multiple independently switchable electrodes, each set of apertures being aligned above a respective one of the electrodes electrode.

In accordance with a second aspect of the invention, there is provided a method of electrospinning at least one array of fibres using apparatus in accordance with the first aspect, the method comprising:

a) electrospinning fibres from the fibre source towards the conductive collector surface such that the fibres are collected on the fibre support layer of the laminate fibre collection structure without discharging the collected fibres.

Where the conductive collector surface and the fibre source are movable relative to one another, the method may comprise moving the conductive collector surface and the fibre source relative to one another whilst electrospinning fibres from the fibre source towards the conductive collector surface.

The method may comprise depositing fibres on a surface of the fibre support layer such that in respect of said at least one set of apertures, fibres extend across the first apertures in a non-aligned mat and across the second aperture in said array. Where the non-conductive laminate fibre collection structure defines more than one set of apertures, the method may comprise depositing fibres on a surface of the fibre support layer such that in respect of at least some of the sets of apertures, fibres extend across the first apertures in a non-aligned mat and across the second aperture in said array.

After electrospinning, the method may comprise separating the fibre support layer from the base layer, with the electrospun fibres supported on the fibre support layer.

The method may comprise combining a secondary support layer with the fibre support layer to form a laminated fibre support structure in which with the fibres are sandwiched in-between the fibre support layer and the secondary support layer.

The secondary support layer may define a plurality of fourth apertures each fourth aperture corresponding to and aligning with a respective first aperture defined in the fibre support layer.

The secondary support layer may define one or more fifth apertures, each fifth aperture corresponding to and aligning with a respective second aperture defined in the fibre support layer.

The secondary support layer and the fibre support layer may each define a substantially identical pattern of apertures, corresponding apertures in the two layers being aligned with one another.

Where the fibre support layer comprises a plurality of said first groups of apertures, the method may comprise dividing the fibre support layer into a number of discrete units, each unit comprising at least one array of fibres.

Where a secondary support layer is combined with the fibre support layer to form a laminated fibre support structure, the method may comprise dividing the laminated fibre support structure into a number of discrete units, each unit comprising at least one array of fibres. Each unit may comprise a non-aligned mat of fibres located either side of an array of fibres.

The fibres may be nanofibres. The nanofibres may be in the range of 10 nanometres to 10 micrometers in diameter.

The fibres in the, or each, array may be predominantly aligned with one another.

In accordance with a third aspect of the invention, there is provided a laminate fibre collection structure for use in the apparatus in accordance with the first aspect of the invention or the method in accordance with the second aspect of the invention, the laminate fibre collection structure comprising a base layer and a fibre support layer releasably affixed to the base layer, at least one set of apertures defined in the fibre support and base layers, the at least one set including a first group of apertures defined through the fibre support layer and a second group of apertures defined through the base layer, the first group including a pair of first apertures spaced apart from one another and a second aperture located between the spaced first apertures, the second group including a pair of third apertures spaced apart from one another, each of the third apertures being aligned with a corresponding one of the first apertures, each pair of aligned first and third apertures defining an opening through the laminate fibre collection structure.

A plurality of said sets of apertures may be defined in the laminate fibre support structure, which sets of apertures may be substantially identical to one another. Each set of apertures may be a discreet cell of apertures. In which case, the cells may be spaced apart from one another by a distance which is greater than the spacing between the first apertures in each cell. Alternatively, at least some adjacent sets may share common first and third apertures.

In an embodiment, each of the first and third apertures is elongate, having a length greater than its width. The first and third apertures may be generally rectangular.

In an embodiment, the, or each, second aperture is elliptical. In which case, the major axis of the, or each, second aperture may be aligned parallel to the longitudinal extents of the first and third apertures.

In an embodiment, the ratio of length to width of each set of apertures is in the range of 1.5:1 to 1:1.5.

The non-conductive laminate fibre collection structure may be rigid or flexible.

In accordance with a fourth aspect of the invention, there is provided a fibre support structure incorporating at least one fibre array, the structure comprising a fibre support layer defining at least one group of apertures, each group comprising pair of first apertures spaced apart from one another and a second aperture between said pair of spaced first apertures, fibres dispersed on a surface of the fibre support layer and extending across the first apertures in a non-aligned mat and across the second aperture in an aligned array.

The fibre support layer may define a plurality of said groups of apertures.

The fibre support structure may comprise a secondary support layer, the fibres sandwiched in-between the fibre support layer and the secondary support layer.

The secondary support layer may define a plurality of fourth apertures which correspond to and align with the first apertures defined in the fibre support layer.

The secondary support layer may define one or more fifth apertures, each fifth aperture corresponding to and aligning with one of the second apertures defined in the fibre support layer.

The secondary support layer and the fibre support layer may have substantially identical patterns of apertures, corresponding apertures in the two layers being aligned with one another.

The fibre support layer and/or the secondary support layer may be made of polymeric materials or ceramic materials.

The fibre support layer and/or the secondary support layer may be a sheet of material or may be made by additive layer manufacturing techniques.

The fibres may be nanofibres. The nanofibres fibres may range between 10 nanometres to 10 micrometers in diameter.

DETAILED DESCRIPTION OF THE INVENTION

In order that the invention may be more clearly understood an embodiments thereof will now be described, by way of example only, with reference to the accompanying drawings, of which:

FIG. 2 is a plan view from above of an embodiment of a fibre support layer forming part of a laminate fibre collecting structure for use in apparatus and methods in accordance with the invention and showing a pattern of apertures defined through the fibre support layer;

FIG. 3 is an enlarged view of part of the pattern of apertures defined in the fibre support layer of FIG. 2;

FIG. 4 is a plan view from below of a base layer forming part of a laminate fibre collecting structure for use in apparatus and methods in accordance with the invention, showing a pattern of apertures defined through;

FIG. 5 is an enlarged view of part of the pattern of apertures defined in the base layer of FIG. 4;

FIG. 6 is a cross sectional view through part of a laminate fibre collecting structure comprising the fibre support layer of FIG. 2 and the base layer of FIG. 4, illustrating a set of apertures defined in the structure;

Figure 11:
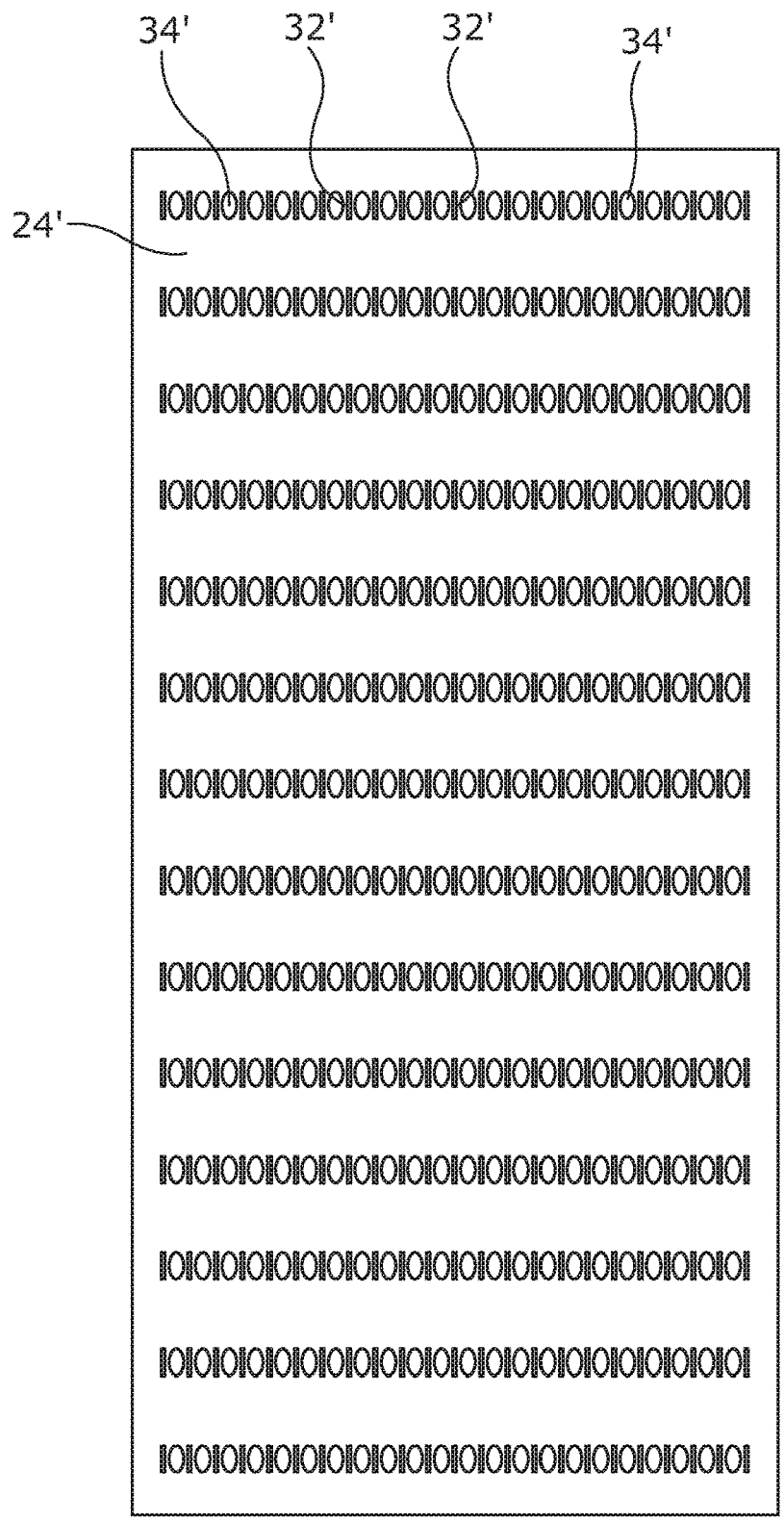
Figure 12:
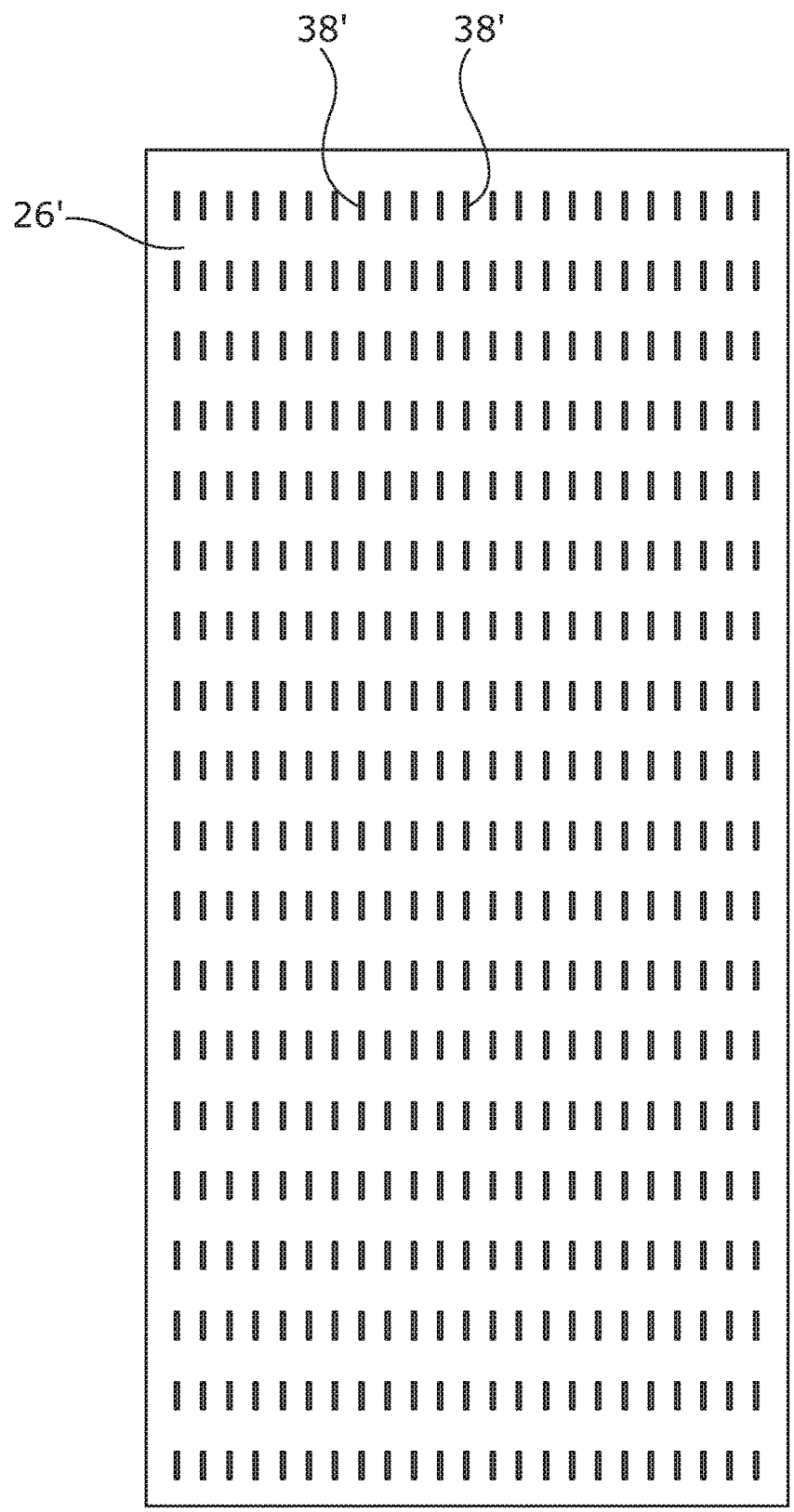

FIG. 11 is a plan view from above of a further embodiment of a fibre support layer forming part of a laminate fibre collecting structure for use in apparatus and methods in accordance with the invention, showing an alternative pattern of apertures; and FIG. 12 is a plan view from above of a further embodiment of a base layer forming part of a laminate fibre collecting structure together with the fibre support layer of FIG. 11.

The invention will be described in relation to embodiments of apparatus and methods for electrospinning nanofibres.

Figure 1:
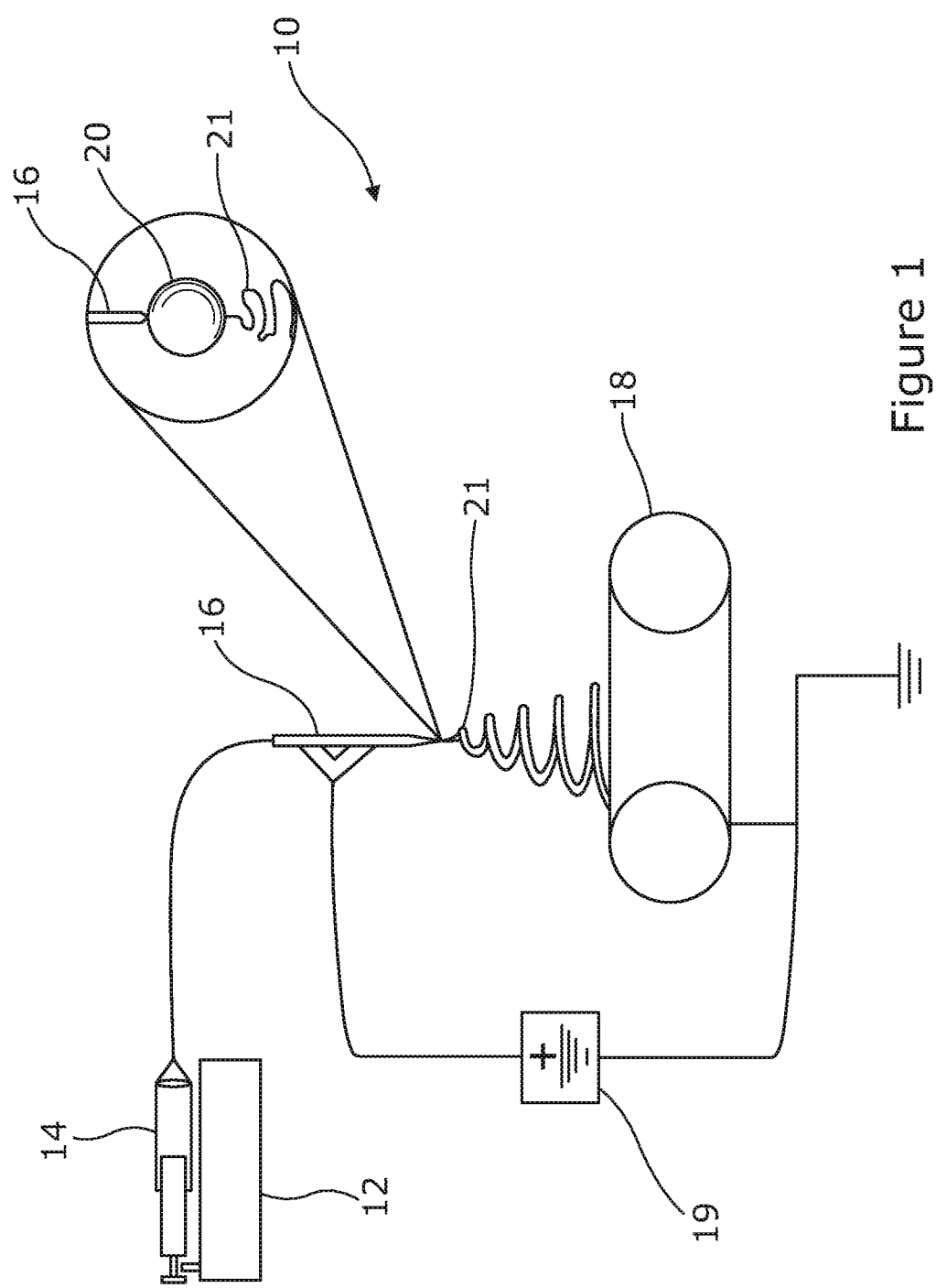
FIG. 1 is a schematic representation of a known electrospinning apparatus.

An embodiment of apparatus for electrospinning one or more arrays of aligned nanofibres from an electrospinning fluid in accordance with a first aspect of the invention includes the same basic set up as in the prior art arrangement described above with reference to FIG. 1. The apparatus includes a syringe pump 12 which holds a syringe 14 containing an electrospinning fluid. The syringe 14 is fluidly connected to an electrically conductive delivery source or spinneret such as a metal capillary needle 16. A conductive collector 18 is spaced from the needle 16 and a high voltage electrical supply 20 (typically 5 to 50 kV direct current power supply) is connectable to the needle. The collector 18 in this embodiment is grounded so that a potential difference is created between the needle 16 and the collector 18 in use when the high voltage supply is connected. However, other arrangements for holding the conductive collector 18 at an electrical potential to create a potential difference between the collector 18 and the needle 16 can be adopted. For example, the collector could be made up of one or more electrodes which can be switched to create a potential difference between the collector surface and the fluid source.

The collector 18 in this case is in the form of a re-circulating belt of conductive material. The use of a re-circulating belt produces relative movement between the collector 18 and a stationary needle 16 in use. However, other arrangements which produce such relative movement can be adopted. For example, the collector 18 could take the form of a rotatable drum or an oscillating flat plate. In a further alternative, it would be possible for the needle 16, or other electrospinning source, to move in x and y directions above a fixed or moving collector plate, for example.

Figures 4, 5:
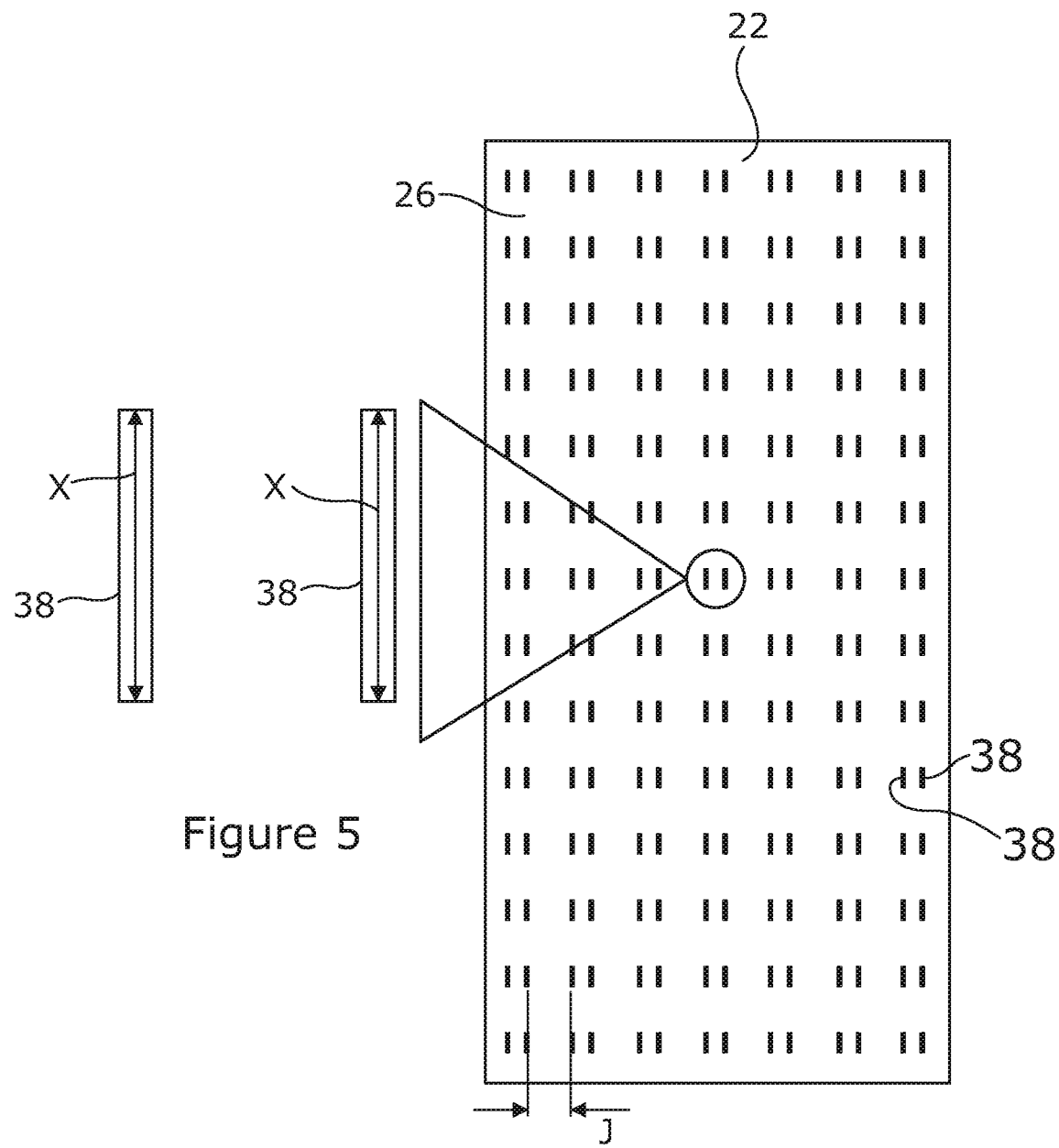

In addition to the basic apparatus 10, a non-conductive laminate fibre collection structure 22 is mounted flat on to the outer surface of the collector belt 18 so as to lie between the belt 18 and the needle 16. The non-conductive laminate fibre collection structure 22 comprises a fibre support layer 24 as shown in FIG. 2 releasably attached to a base layer 26 as shown in FIG. 4. The fibre support layer 24 and the base layer 26 are each made from a non-conductive material. The fibre support layer 24 and the base layer 26 may each be made from a polymeric material such as polyester and/or polypropylene and may be made from the same material. Other suitable materials from which the fibre support layer 24 and the base layer 26 can be made include, without limitation: biorientated polystyrene, orientated polystyrene, kapton, polyetherimide, polytetrafluoroethylene, silicone, perfluoroelastomer, viton, polyurethane. The fibre support layer 24 and base layer 26 can be made of materials having any appropriate thickness but in the present embodiment, the fibre support layer may have a thickness in the range of 5 micrometres to 5 millimetres, whilst the base layer 26 may have a thickness in the range of 5 micrometres to 2 mm.

In the present embodiment, the fibre support layer 24 and the base layer 26 each comprise a thin, flexible sheet of polymeric material that are joined together in alignment by any suitable method, such as by tack welding, for example. In this embodiment, the sheets 24, 26 are laminated together and then the structure 22 is mounted to the collector 18. However, in an alternative arrangement, the base layer sheet 26 could be fixed to the collector 18 and the fibre support layer sheet 24 mounted to the base layer 26 in situ. In a variation, the base layer 26 case could take the form of a mask which is permanently, or semi-permanently, mounted to the collector with a sheet of non-conductive material to form the fibre support layer 24 being releasably mounted to the base layer 26 for electrospinning.

In the present embodiment where the collector 18 curves, at least the fibre support layer 24 is flexible to enable it to conform to the curvature of the collector. Where the base layer 26 is also a sheet of material which is mounted to the collector, it too would be flexible. However, in the event that a flat collector plate is used, the laminate fibre collection structure 22 can be rigid so that the fibre support layer and the base layer could be made from a broader range of non-conductive materials, including ceramics.

The laminate fibre collection structure 22 is dimensioned to extend over all or a majority of the outer surface of the collector 18 and is rotationally fast with the collector 18.

A first pattern of apertures is defined in the fibre support layer 24 and a second pattern of apertures is defined in the base layer 26, the apertures in the two layers combining to define a number of sets of apertures, indicated generally at 30, when the two layers are attached together to form the laminate fibre collection structure 22, as illustrated in FIG. 6.

The pattern of apertures defined in the fibre support layer 24 include a number of first apertures 32 which are arranged in spaced apart pairs and a number of second apertures 34, with each second aperture 34 being located between a pair of first apertures 32. FIG. 3 shows in more detail a first group of apertures in the fibre support layer which first group includes a pair of first apertures 32 with a second aperture 34 in-between. The first apertures 32 are each generally rectangular in plan and are all aligned with their longitudinal axes X parallel to one another and with the direction of movement (rotation) of the collector 18 when the laminate fibre collection structure 22 is mounted to the collector 18. The second apertures 34 are elliptical, having a major axis Y aligned parallel to the longitudinal axes X of the first apertures 32 and hence also with the direction of movement of the collector 18. The first and second apertures 32, 34 are substantially the same length. In the present embodiment, which should be understood as being non-limiting, each second aperture 34 has a length measured along its major axis Y of about 10 mm and a width measured along its minor axis Z of about 5 mm. Each of the first apertures 32 has a length measured along its longitudinal axis X of about 10 mm and a width measured transversely to the longitudinal axis of approximately 2 mm. The spacing between the opposed inner side edges 36 of the first apertures 32 in each group is approximately 8 mm and there is a minimum spacing W at the minor axis Z between the inner edge 36 of each first aperture 42 and the second aperture of about 1.5 mm.

The pattern of apertures defined in the base layer 26 is illustrated in FIGS. 4 and 5 and is made up of a number of third apertures 38 arranged in spaced pairs, wherein each spaced pair can be considered a second group of apertures. The third apertures 38 are identical in size, shape and relative location to the first apertures 32 such that when the fibre support layer 24 is mounted to the base layer 26, respective first 32 and third apertures 38 are in alignment to define openings 40 that extend fully through the laminate structure 22 as can be seen in FIG. 6. The laminate fibre collection structure 22 is arranged on the collector 18 with the base layer 26 located proximal to the surface of the collector and with the fibre support layer 24 above the base layer 26. The surface of the collector 18 is exposed through the openings 40 defined by the aligned first 32 and third 38 apertures, whilst the surface of the collector is covered by a region 26A of the non-conductive base layer 26 below each of the second apertures 34. It is not necessarily essential that the third apertures 38 are identical to the first apertures 32 provided that when the completed laminate fibre collection structure 22 is mounted to the collector 18, regions of low potential (or high potential difference) are created along either side of each second aperture 34 during electro spinning.

Each set 30 of apertures in combination enable an aligned array of nanofibres to be electrospun across the second aperture 34 in the fibre support layer 24 as will be described below. Each set 30 of apertures in the present embodiment has an aspect ratio, that is to say a ratio of length to width (where the width is measured between the outer edges 41 of the first/third apertures) of 1:1.2. It has been found that using a set 30 of apertures with an aspect ratio close to 1:1 is particularly advantageous. For example, the aspect ratio of each set may be in the range 1.5:1 to 1:1.5. In particular, it has been found that an aspect ratio of this order maximises alignment of the nanofibres The patterns of apertures in the fibre support layer 24 and the base layer 26 according to the present embodiment are arranged to define a number of sets 30 of apertures spaced apart in an array in the laminate structure 22 so that a corresponding number of aligned arrays of fibre can be produced as part of the same electrospinning procedure. In the present embodiment, each set 30 apertures can be considered a discrete entity or cell which is spaced apart by a distance J of around 30 mm from the nearest adjacent cells. The spacing J between adjacent cells is significantly larger than the spacing between the openings 40 defined by the aligned first and third apertures in each cell.

The apertures 32, 34, 38 can be cut in the fibre support layer 24 and the base layer 26 by any suitable method, such as by means of a $CO_2$ laser cutter where the layers comprise sheets of polymeric materials.

With the laminate fibre collection structure 22 rotationally fast on the outer surface of the collector 18, electrospinning can commence. It should be noted that in the method in accordance with the invention, the electrostatic charge of the fibre collected on the laminate fibre collection structure 22 is not discharged, for example by means of a remote ionisation source.

To initiate the electrospinning process, an electrospinning fluid is pumped from the syringe 14 at a controlled feed rate to the needle 16 or other suitable spinneret, a high voltage is applied to the needle and the collector 18 belt is rotated. The collector can be rotated at any suitable speed. In the present embodiment, the collector is rotated so as to move the laminate fibre collection structure 22 relative to the needle 16 at a speed of up to 50 meters/second. Charge separation in the fluid reduces the surface tension of the fluid at the end of the needle until a Taylor cone 20 is formed and a continuous jet of fluid is emitted towards the conductive grounded collector 18. As the jet of fluid travels towards the collector 18 it desolvates to form a fibre 21.

The electrostatically charged fibre 21 is drawn to one of the openings 40 defined by a pair of aligned first and third apertures 32, 38 in which the grounded (low electrical potential) surface of the collector 18 is exposed. At the opening 40, the fibre collects on the fibre support layer 24 and forms a bridge of nanofibre which spans the first aperture 32 in the fibre support layer. The bridge acts to prevent the nanofibre from reaching the surface of the low potential collector 18 so that the charge in the fibre is not discharged. Since no steps are taken to discharge the fibre by other means, such as by use of a remote ionisation source, an electrostatic charge starts to build up in the collected fibre. As the same fibre lays down on the laminate structure it is influenced by electrostatic forces and electric potentials electrostatic forces repelling the fibre and electric potentials acting to attract the fibre. If the fibre has high flexibility it may twist and turn with low bend radius. For stiff fibres the allowable bend radius will be greater. Hence the mechanical properties of the fibre will influence how it deposits due to electrostatics and electrical potentials. When the charge on the fibre bridge at the first opening 40 is sufficient to repel or re-direct new spun nanofibre 21, the nanofibre 21 moves to the next nearest lowest potential region which is the second opening 40 in the set on the opposite side of the second aperture 34. The nanofibre 21 tends to take the shortest path from the first opening 40 towards the second opening 40 and so creates a fibre which extends across the second aperture 34 in a direction orthogonal to the major axis Y of the ellipse. At the second opening 40, the fibre forms a further bridge across the respective first aperture 32 and an electrostatic charge begins to build up. When the charge is sufficient, the nanofibre will again be repelled or re-directed and will be drawn to a further opening 40, which may be associated with another of the sets 30 of apertures. The process can continue with the fibre moving randomly between the various sets 30 of apertures until each the second apertures 34 in the fibre support layer 24 is substantially covered by an aligned array of fibres deposited on the fibre support layer 24.

Figure 7:
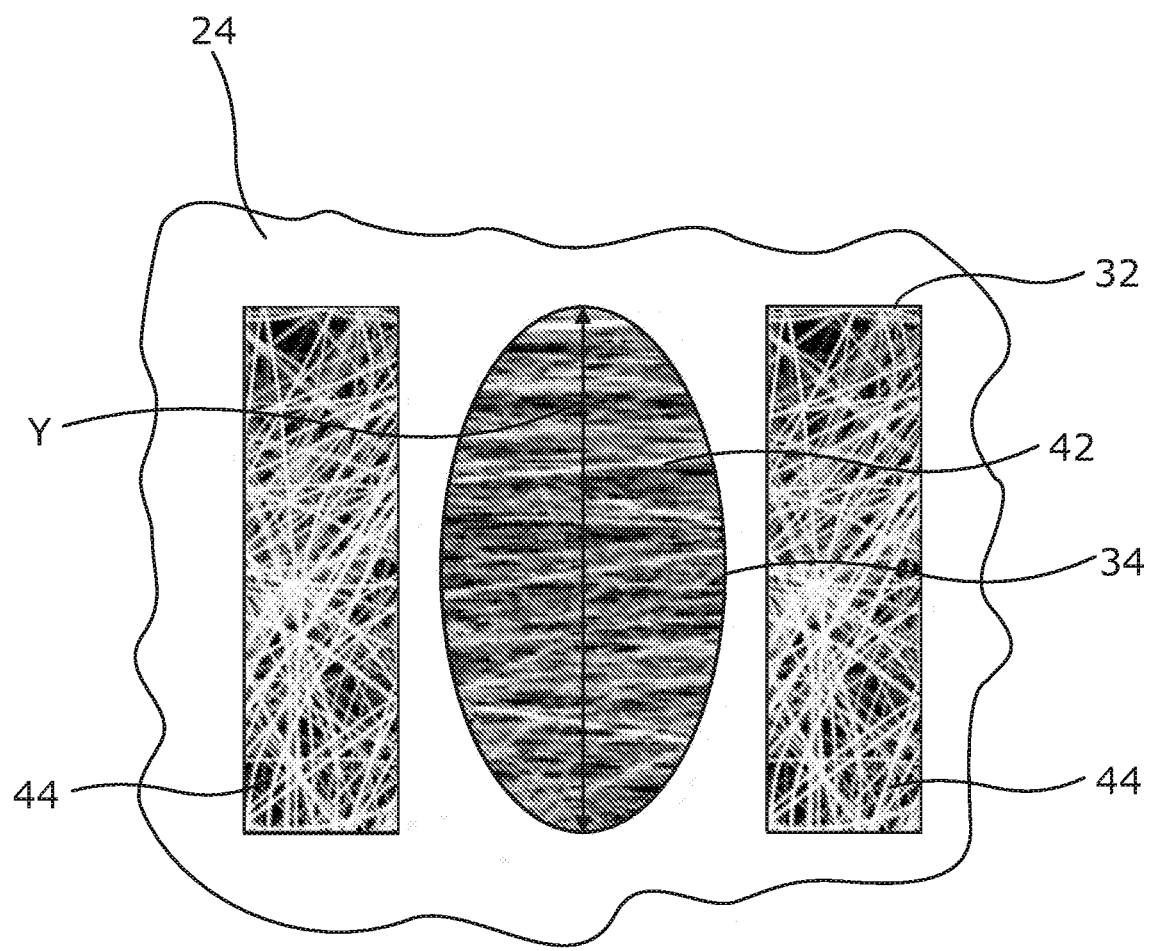
FIG. 7 is a plan view from below of part of the fibre support layer of FIG. 2 after electrospinning, showing an arrangement of nanofibres collected on the sheet.
Figure 8:
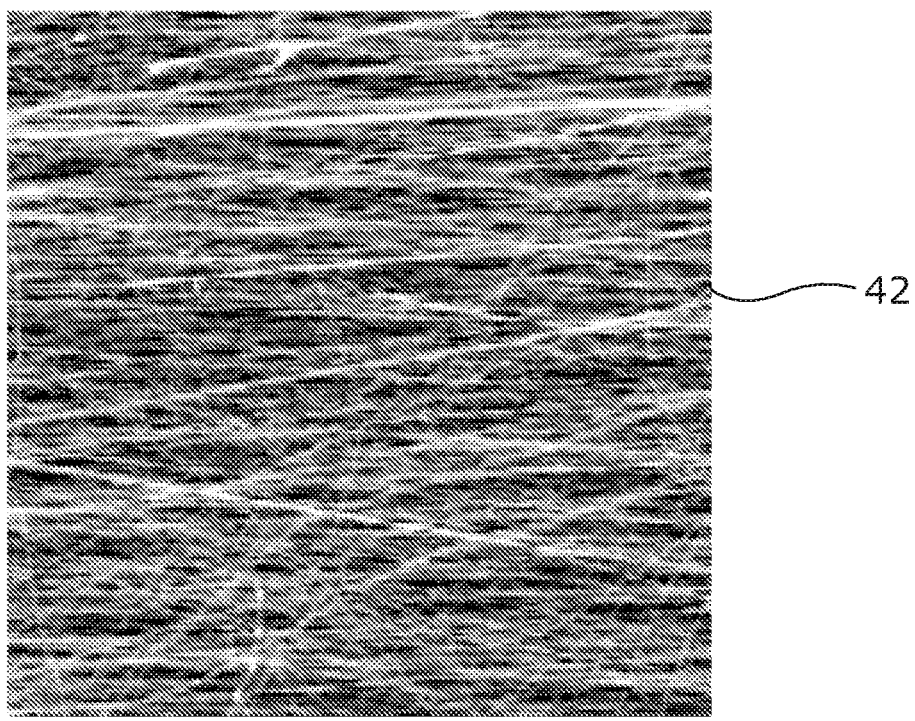
FIG. 8 is a scanning electron micrograph showing nanofibres extending across a part of a second aperture defined in the fibre support layer of FIG. 6, the fibres being predominantly uniaxially aligned.
Figure 9:
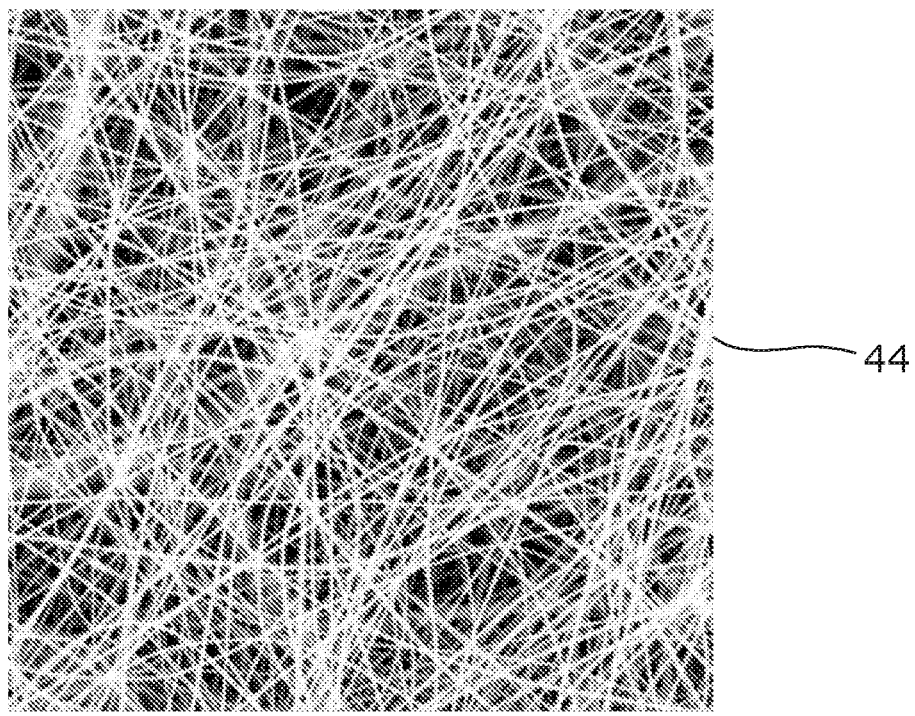
FIG. 9 is a scanning electron micrograph showing nanofibres extending across a part of a first aperture defined in the fibre support layer of FIG. 6, the fibres being substantially unaligned.

The electrospinning process can be continued until each second aperture 34 in the fibre support layer 24 is covered in an array 42 of nanofibres in which the fibres are at least predominantly aligned with one another in a common orientation orthogonal to its major axis Y and each of the first apertures 32 is covered by a mat 44 of unaligned nanofibres. FIG. 7 illustrates schematically the fibres 21 deposited on one cell of the fibre support layer 24 to form mats 44 across each of the first apertures and an aligned array 42 across the second aperture 34 as viewed from below, that is to say looking at the face of fibre support layer 24 which abuts the base layer 26 during electrospinning. FIG. 8 is a scanning electron micrograph showing on an enlarged scale aligned fibres making up an array 42 spanning a second aperture 32 in which the fibres are predominantly aligned with one another and FIG. 9 is a scanning electron micrograph showing on an enlarged scale unaligned fibres making up a mat 44 spanning a first aperture 32.

Once the electrospinning is complete, the fibre support layer 24 is separated from base layer 26 to leave the nanofibres supported on the fibre support layer 24 with the aligned arrays 42 and the unaligned mats 44 accessible from both sides. The base layer 26 can be reused with a further fibre support layer 24 in a further electrospinning process. The entire laminate fibre collection structure 22 can be removed from the collector 18 prior to separating the fibre support layer 24 from the base layer 26. Alternatively, the fibre support layer 24 can be separated from the base layer 26 whilst the base layer 26 remains on the collector 18 for subsequent use with a new fibre support layer 24.

Figure 10:
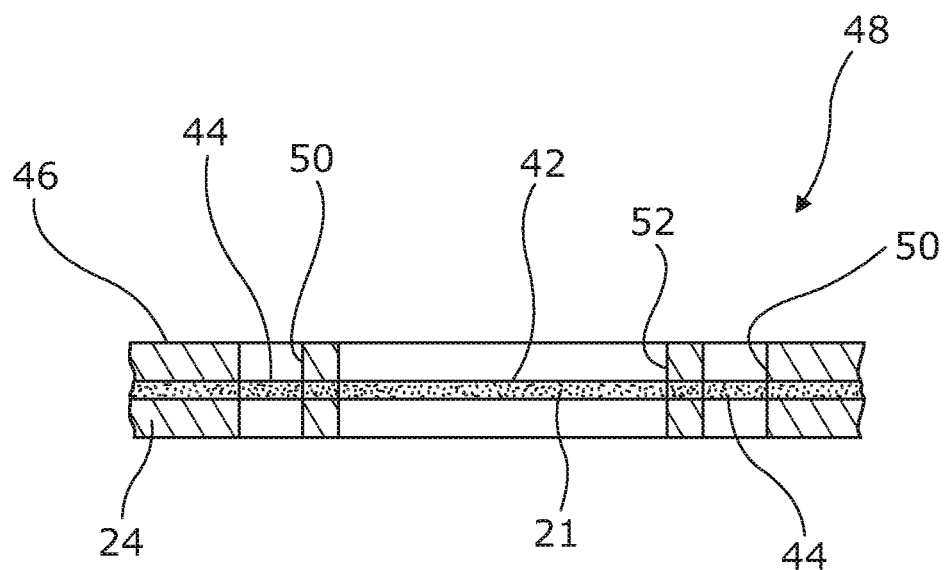
FIG. 10 is a schematic cross sectional view through a part of a laminated fibre support structure in accordance with an aspect of the invention.

Because the aligned arrays 42 are supported by the fibre support layer 24, they are relatively easy to handle without being damaged. To provide additional support, a secondary support layer 46 can be combined with the fibre support layer 24 to form a laminated fibre support structure 48 in which with the nanofibres 21 are sandwiched in-between the fibre support layer 24 and the secondary support layer 46, as illustrated schematically in FIG. 10. The secondary support layer 46 may be made of the same material as the fibre support layer 24 and may be provided with a pattern of apertures to allow access to the aligned arrays 42 and/or to the unaligned mats 44 as desired. In one embodiment, the secondary support layer 46 has an identical pattern of apertures to that of the fibre support layer 24 and defines fourth apertures 50 which correspond with the first apertures 32 and fifth apertures 52 which correspond with the second apertures 34 so that the aligned arrays 42 and the unaligned mats 44 of nanofibres remain accessible from both sides of the completed structure. However, the secondary support layer 46 could have a different pattern of apertures. For example, the secondary support layer 46 may only define apertures which correspond to and align with the second apertures 34 in the fibre support layer 24. This might be desirable where it is intended to access the aligned arrays 42 from both sides but where access to the unaligned mats 44 from both sides is not essential.

In the above described laminated fibre support structure 48, the fibre support layer 24 and the secondary support layer 46 can be made from identical sheets of material bonded together. Methods to bond the sheets include laser welding, ultrasonic welding, and adhesive bonding. Alternatively, a fibre support structure 48 can be formed by the additive layer manufacture of a secondary support layer 46 onto the fibre coated side of the fibre support layer 24.

The laminated fibre support structure 48 with nanofibres sandwiched in-between the fibre support layer 24 and a secondary support layer 46 is easy to handle without damaging the fibres. The laminated fibre support structure 48 can be cut or otherwise divided as required to separate any one or more of the aligned arrays 42, with or without the associated unaligned mats 44 on either side, from the remainder of the structure. For example, the laminated structure 48 could be divided into a number of separate units, each unit comprising a pair of unaligned mats 44 with an aligned array 42 in-between.

Whilst a laminated fibre support structure 48 provides a robust structure for supporting and handling the electrospun arrays and mats of fibre, it is not essential for all applications. For use in some applications it may be sufficient to support the fibres on the fibre support layer 24 alone or to provide some alternative means of covering or partially covering the fibres on the fibre support layer 24. As with the laminated fibre support structure 48, a fibre support layer 24 which is covered in fibres after electrospinning can be cut or otherwise divided to separate any one or more of the arrays 42 and/or mats 44 from the remainder of the layer.

Forming the sets 30 of apertures as discrete cells spaced apart from one another can be advantageous as it enables a fibre supporting structure 24 or 48 to be separated into units, each unit comprising an aligned array 42 with a pair of unaligned mats of fibres 42 on either side connected to the array. In some applications it may be advantageous to use both the unaligned mats 44 and the aligned array 42. The separation between cells also ensures that during electrospinning when a fibre forms a bridge across a first of the openings 40 in a cell it will tend to be drawn to the second opening 40 in the same cell on the other side of the second aperture 34 when the fibre is repelled as the openings 40 in the same cell are closer together than the openings 40 of adjacent cells. However, this is not always essential and the pattern of apertures could be modified provided that each second aperture 34 in the fibre support layer is located between a pair first apertures 32 and that the base layer 26 has third apertures 36 which corresponded to and align with the first apertures. FIGS. 11 and 12 for example illustrate part of an alternative pattern of apertures in the fibre support layer 24' and base layer 26'. In this alternate pattern, the first apertures 32' in the fibre support layer 24' are arranged in rows equi-spaced apart with a second aperture 34' between each adjacent pair of first apertures 32'. The third apertures 36' in the base layer 26 are arranged to correspond with the first apertures 32'. In this arrangement adjacent sets 30 of apertures share common aligned first and third apertures 32', 36' to define openings either side of each second aperture 34'.

Whilst in the presently described embodiment the electrostatically charged fibre 21 moves randomly between the various sets 30 of apertures to form the aligned arrays across the various second apertures 34 during electrospinning, the apparatus and method could be adapted so that an array is completed across each second aperture 34 one at a time. This could be achieved by using a collector which is comprised of multiple independently switchable electrodes, where each electrode aligns to and is under a cell 30 in the laminated collector sheet. The electrodes can be independently and selectively switched to create an electrical potential difference between each electrode and the fibre source. For example, by switching one electrode to 0 kV and raising the potential of the remaining electrodes to 7 kV ensures the electrospun fibre is attracted to a first cell 30 which is located above the electrode with the lowest electrical potential. Once the aligned array has been spun on this first cell, the electrode beneath it can be switched to raise its potential and a second electrode switched to 0 kV so that the fibre is attracted to the cell 30 above the second electrode and so on.

Whilst is expected that in most applications the collector 18 and the fibre source 16 will be moved relative to one another during electrospinning in order to produce a number of arrays 42 on a laminate fibre collection structure with multiple sets 30 of apertures. It is possible to use the method without such relative movement by only electrospinning for a short time with the non-conductive laminate fibre collection structure under the fibre source. This might be done where only one or two aligned arrays are to be produced at a time.

The aligned arrays 42 of fibres produced in accordance with the invention can be used in a range of applications including, but not limited to, tissue engineering, therapeutic inserts, sensors, nanocomposites, electronic devices, filters, and catalyst support for use in micro fuel cells. For example, cells cultured on a scaffold of uniaxially aligned nanofibres will tend to proliferate along the fibres in the direction of fibre orientation.

The shape and dimensions of the first, second and third apertures 32, 34, 38 are not limited to those described above. However, it has been found that use of an elliptical second aperture 34 leads to a more uniform coverage during electrospinning. The number of sets 30 of apertures defined in the laminate fibre collection structure 22 can be varied depending on the size of the structure and the size of the apertures. In its simplest form, the laminate fibre collection structure 22 could define only a single set 30 of apertures. Indeed it should be noted that the arrangement of apertures in the fibre support layer 24 and the base layer 26 can be varied in numerous ways provided that regions of low potential (or high potential difference) are created along either side of each second aperture 34 during electrospinning.

The above embodiments are described by way of example only. Many variations are possible without departing from the scope of the invention as defined in the appended claims.

The invention claimed is:

1. An apparatus for electrospinning at least one array of fibres from an electrospinning fluid, the apparatus comprising:
   a) a fibre source;
   b) a high voltage supply connectable to the fibre source;
   c) a conductive collector surface spaced from the fluid source, the apparatus configured to hold at least part of the conductive collector surface at an electrical potential to create a potential difference between said at least part of the conductive collector surface and the fluid source in use; and
   d) a non-conductive laminate fibre collection structure covering at least part of the conductive collector surface, the laminate fibre collection structure including a non-conductive base layer proximal to the conductive collector surface and a non-conductive fibre support layer releasably affixed to the base layer, at least one set of apertures defined in the fibre support and base layers, said at least one set of apertures including a first group of apertures defined through the fibre support layer and a second group of apertures defined through the base layer, the first group of apertures including a pair of first apertures spaced apart from one another and a second aperture located between the pair of spaced first apertures, the second group of apertures including a pair of third apertures spaced apart from one another, each of the third apertures being aligned with a corresponding one of the first apertures to define an opening through the non-conductive laminate collection structure.

2. The apparatus as claimed in claim 1, wherein the apparatus comprises an arrangement for moving the conductive collector surface and the fluid source relative to one another.

3. The apparatus as claimed in claim 1, wherein a plurality of said sets of apertures are defined in the laminate fibre support structure.

4. The apparatus as claimed in claim 3, wherein each set is a discreet cell of apertures.

5. The apparatus as claimed in claim 4, wherein the cells are spaced apart from one another by a distance which is greater than the spacing between the first apertures in each cell.

6. The apparatus as claimed in claim 3, wherein at least some adjacent sets share common first and third apertures.

7. The apparatus as claimed in claim 1, wherein each of the first and third apertures is elongate, having a length greater than its width.

8. The apparatus as claimed in claim 7, wherein the apparatus comprises an arrangement for moving the conductive collector surface and the fluid source relative to one another, the first and third apertures being aligned lengthways parallel to one another and to the relative direction of movement between the conductive surface and the fibre source.

9. The apparatus as claimed in claim 1, wherein the, or each, second aperture is elliptical.

10. The apparatus as claimed in claim 9, wherein each of the first and third apertures is elongate, having a length greater than its width and wherein the major axis of the, or each, second aperture is aligned parallel to the longitudinal extents of the first and third apertures.

11. A method of electrospinning at least one array of fibres using the apparatus as claimed in claim 1, the method comprising:
  a) electrospinning fibres from the fibre source towards the conductive collector surface such that the fibres are collected on the fibre support layer of the laminate fibre collection structure without discharging the collected fibres.

12. The method as claimed in clam 11, the method comprising, after electrospinning, separating the fibre support layer from the base layer with the collected fibres supported on the fibre support layer.

13. The method as claimed in claim 12, the method comprising combining a secondary support layer with the fibre support layer with the collected fibres sandwiched in-between the fibre support layer and the secondary support layer.

14. The method as claimed in claim 13, wherein the secondary support layer defines a plurality of fourth apertures each fourth aperture corresponding to and aligning with a respective first aperture defined in the fibre support layer.

15. The method as claimed in claim 13, wherein the secondary support layer defines one or more fifth apertures, each fifth aperture corresponding to and aligning with a respective second aperture defined in the fibre support layer.

16. The method as claimed in claim 13, wherein the secondary support layer and the fibre support layer each define a substantially identical pattern of apertures, corresponding apertures in the two layers being aligned with one another.

17. The method as claimed in claim 11, wherein the fibres in the at least one array are predominantly aligned with one another.

* * * * *